US012136177B2

United States Patent
Danielson et al.

(10) Patent No.: US 12,136,177 B2
(45) Date of Patent: Nov. 5, 2024

(54) MACHINE VISION HAND AND TOOL TRACKING

(71) Applicant: HEWLETT-PACKARD DEVELOPMENT COMPANY, L.P., Spring, TX (US)

(72) Inventors: Jon Danielson, Fort Collins, CO (US); Adolfo Adolfo Gomez, Fort Collins, CO (US); Mark Lessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 113 days.

(21) Appl. No.: 17/970,849

(22) Filed: Oct. 21, 2022

(65) Prior Publication Data

US 2024/0135653 A1 Apr. 25, 2024
US 2024/0233278 A9 Jul. 11, 2024

(51) Int. Cl.
| | |
|---|---|
| *G06T 19/00* | (2011.01) |
| *G06F 3/01* | (2006.01) |
| *G06T 7/246* | (2017.01) |
| *G06T 7/73* | (2017.01) |
| *G06V 20/20* | (2022.01) |

(52) U.S. Cl.
CPC .......... *G06T 19/006* (2013.01); *G06F 3/011* (2013.01); *G06T 7/246* (2017.01); *G06T 7/73* (2017.01); *G06V 20/20* (2022.01); *G06T 2207/30196* (2013.01)

(58) Field of Classification Search
CPC ......... G06T 19/006; G06T 7/246; G06T 7/73; G06T 2207/30196; G06V 20/20; G06F 3/011
See application file for complete search history.

(56) References Cited

U.S. PATENT DOCUMENTS

| | | | | |
|---|---|---|---|---|
| 9,943,372 | B2 * | 4/2018 | Sholev | A61B 17/00234 |
| 10,698,493 | B1 * | 6/2020 | Crowther | A61B 34/37 |
| 11,037,464 | B2 * | 6/2021 | Ho | G09B 23/28 |
| 11,051,897 | B2 * | 7/2021 | Namiki | A61B 34/10 |
| 11,071,596 | B2 * | 7/2021 | Ryan | G02B 27/0093 |
| 11,918,310 | B1 * | 3/2024 | Roh | G16H 50/70 |
| RE49,930 | E * | 4/2024 | de Almeida Barreto | H04N 13/221 |
| 2016/0007827 | A1 * | 1/2016 | Frimer | A61B 1/00006 700/275 |
| 2016/0324580 | A1 * | 11/2016 | Esterberg | A61B 34/10 |
| 2018/0247560 | A1 * | 8/2018 | Mackenzie | A61B 90/361 |

(Continued)

*Primary Examiner* — Doon Y Chow
(74) *Attorney, Agent, or Firm* — Quarles & Brady LLP

(57) ABSTRACT

In an example in accordance with the present disclosure, an extended reality system is described. The extended reality system includes an imaging system to present virtual objects to a user. The extended reality system also includes a machine vision tracking system. The machine vision tracking system includes a camera to capture images of a user's hand a tool grasped in the user's hand. The machine vision tracking system also includes a processor. The processor 1) tracks a position and orientation of the user's hand in physical space, 2) identifies the tool grasped in the user's hand, and 3) tracks a position and orientation of the tool in physical space. The extended reality system also includes an XR controller to manipulate the XR environment based on the position and orientation of the tool and the position and orientation of the hand.

20 Claims, 7 Drawing Sheets

(56) References Cited

U.S. PATENT DOCUMENTS

| | | | | |
|---|---|---|---|---|
| 2019/0142520 A1* | 5/2019 | VanDyken | ............ | A61B 34/20 |
| | | | | 606/1 |
| 2023/0177703 A1* | 6/2023 | Fathollahi | .......... | G06V 10/7715 |
| | | | | 382/103 |
| 2024/0062476 A1* | 2/2024 | Danielson | ............ | G06T 19/006 |

* cited by examiner

MACHINE VISION HAND AND TOOL TRACKING

BACKGROUND

Extended reality (XR) environments present a visual display of digital content that a user can interact with. Virtual reality (VR) systems present virtual imagery that is representative of physical spaces and/or objects. AR systems provide a real-world view of a physical environment with virtual imagery/objects overlaid thereon. MR systems recreate a real-world with virtual imagery/objects overlaid thereon to a user when the user does not have a direct view of the real world. In each of these environments, a user may interact with the computer-generated objects within the environment.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
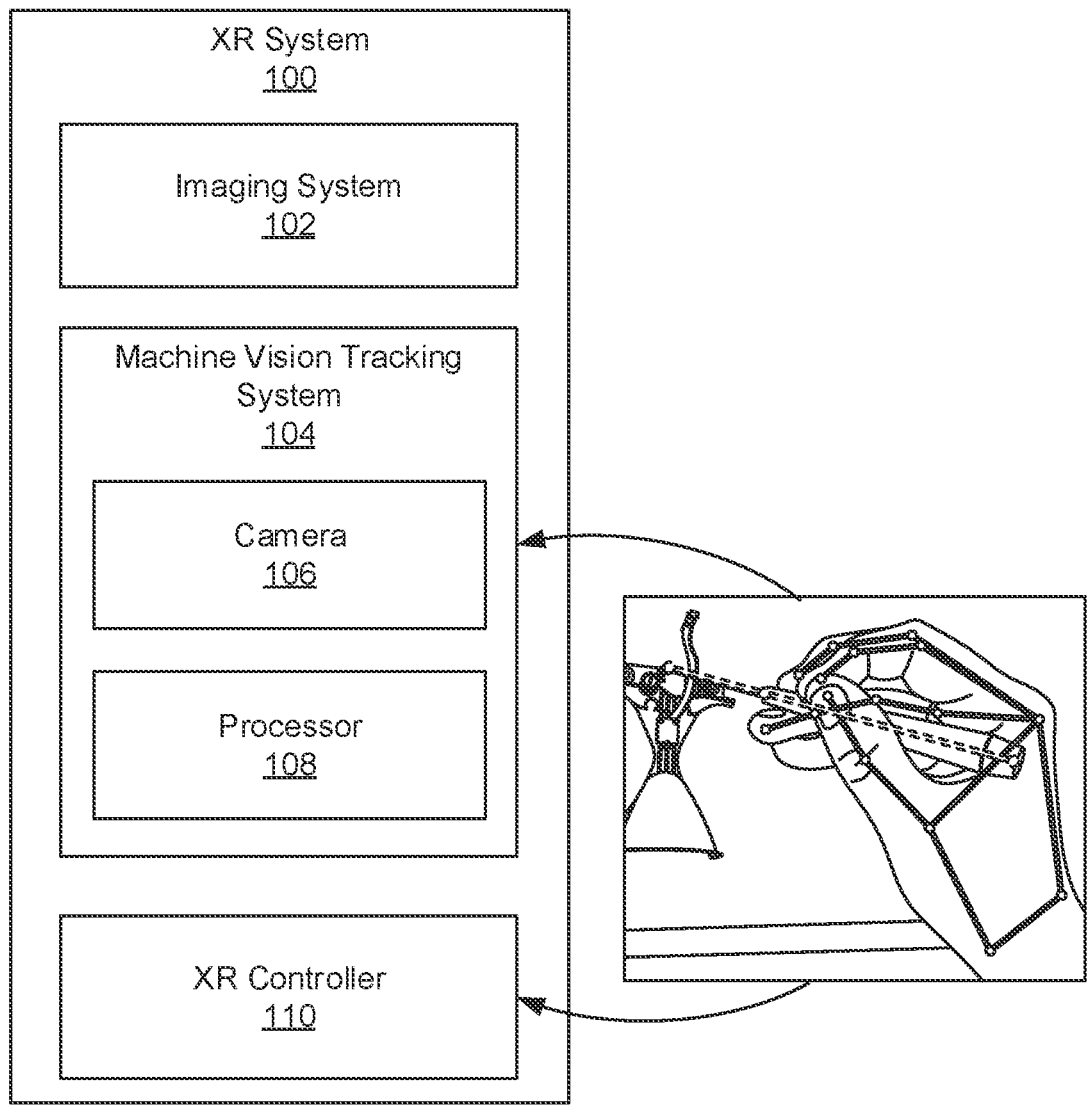
FIG. 1 is a block diagram of an extended reality (XR) system for machine vision hand and tool tracking, according to an example of the principles described herein.

Throughout the drawings, identical reference numbers designate similar, but not necessarily identical, objects. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Extended reality (XR) systems present an environment wherein a user can interact with digital objects within the environment. XR systems include virtual reality (VR) systems, augmented reality (AR) systems, and mixed reality (MR) systems. A VR system presents virtual imagery representative of physical spaces and/or objects. AR systems provide a real-world view of a physical environment with virtual imagery/objects overlaid thereon. MR systems recreate a real world to a user with virtual imagery/objects overlaid thereon when the user does not have a direct view of the real world. For simplicity, VR systems, AR systems, and MR systems are referred to herein as XR systems. Accordingly, as used in the present specification and in the appended claims, the term XR environment refers to that environment presented by the XR system and may include an entirely digital environment, or an overlay of digital elements on a physical scene viewed by the user.

XR systems may include head-mounted displays (HMDs) or AR glasses to present the computer-generated objects to the user either in a completely virtual environment, or on a transparent lens through which the user views a physical environment. The XR systems may also include components that track a user's movement within the XR environment such that the user may interact with the computer-generated objects. As a specific example, a virtual button may be overlaid on top of a physical scene in an AR environment. A user may move their hand, in physical space, towards the virtual button as presented on the AR glasses. When the user's hand, or a virtual representation of such, is in a location that corresponds to the virtual button, the user may make a gesture to depress the virtual button to trigger a function. As another example, a user may move his/her hand, in physical space, to grasp a virtual object presented on the HMD or AR glasses and move the virtual object within the XR environment. In other words, a user moving his/her physical hand in physical space can interact with a virtual object in the XR environment.

Note that while specific reference is made to XR systems that include HMD or AR glasses worn by a user, the XR system described herein may include devices that are not worn by a user, but that create a user immersive experience and track a user's hand and a tool grasped in the user's hand. As a specific example, the XR system may be a kiosk with a three-dimensional display.

Accordingly, the present system includes a machine vision-based hand tracking device to allow users to interact with the XR environment. In other words, the machine vision-based tracking system determines the location of the user's hand relative to the virtual objects such that the user may interact with the virtual objects.

While XR systems have undoubtedly generated a new and exciting field of information presentation and have greatly expanded the opportunities and capabilities for interaction and collaboration, some developments may further enhance XR system use and implementation in a variety of industries.

For example, a user interacts with the XR environment via hand gestures combined with a computer-based hand tracking system. However, while immersed in the XR environment, a user may be holding a physical tool, such as a screwdriver, pencil, pen, electronic probe, or other tool. In this scenario, the user may have to set down the tool before interacting with the virtual object. This is cumbersome and inefficient. Moreover, the user may find it more natural, accurate, or intuitive to interact with virtual objects with the tool, but may be unable to do so. Moreover, the presence of the physical tool in the user's hand may negatively impact the ability of the XR system to track the movement of the user's hand. That is, these physical tools may interfere with the ability of the user to make hand gestures recognizable by the machine vision hand tracking system.

Accordingly, the present specification describes a system to detect the tools in the user's hand and to differentiate the tool from the user's hand. As such, the machine vision hand tracking system tracks the movement of the user's hand even though the user has a tool in hand. Moreover, the tool itself becomes an input device such that the user need not discard the tool before interacting with the virtual objects.

In one example, the XR system implements machine vision image processing to train a computing device to recognize tools that are being held in a user's hand. The position and orientation of the tool can be used to facilitate interaction with the virtual objects in a same way that the location of a user's hand can be used to facilitate interaction with the virtual objects. For example, a machine vision tracking system tracks a position and orientation of the tool and the tool may be used to make gestures recognizable by the XR system (e.g., pointing at and selecting virtual objects and drawing and painting within the XR environment, among other types of interactions). As will be described below, the XR system may implement a machine learning system, such as a neural network, to identify a generic tool or a particular tool.

Specifically, the present specification describes an XR system. The XR system includes an imaging system to present virtual objects to a user. The XR system also includes a machine vision tracking system. The machine vision tracking system includes a camera to capture images of a user's hand and a tool grasped in the user's hand. The machine vision tracking system also includes a processor. The processor is to 1) track a position and orientation of the user's hand in physical space, 2) identify the tool grasped in the user's hand, and 3) track a position and orientation of the tool in physical space. The XR system also includes an XR controller to manipulate the XR environment based on 1) the position and orientation of the tool and 2) the position and orientation of the user's hand.

The present specification also describes a method. According to the method, a machine vision tracking system differentiates a tool grasped in a user's hand from the user's hand. The machine vision tracking system tracks 1) a position and orientation of the user's hand in physical space and 2) a position and orientation of the tool in physical space. According to the method, an XR controller manipulates an extended reality (XR) environment based on 1) the position and orientation of the user's hand and 2) the position and orientation of the tool.

The present specification also describes a non-transitory machine-readable storage medium encoded with instructions executable by a processor. The instructions, when executed by the processor, cause the processor to 1) capture images of the user's hand and a tool grasped in the user's hand, 2) identify, with a machine vision tracking system, the user's hand in the images, and 3) differentiate, with the machine vision tracking system, the tool grasped in the user's hand from the user's hand. The instructions are also executable by the processor to cause the processor to track, with the machine vision tracking system, 1) a position and orientation of the user's hand in physical space and 2) a position and orientation of the tool in physical space. The instructions are also executable by the processor to manipulate an extended reality (XR) environment based on 1) the position and orientation of the tool and 2) the position and orientation of the user's hand.

In summary, such a system, method, and machine-readable storage medium may, for example, 1) allow for virtual object interaction even when grasping a physical tool; 2) differentiate between the hand and the tool such that the machine vision tracking system accurately tracks each element; and 3) implement machine learning such that tool identification need not be hard-coded into the XR system. However, it is contemplated that the devices disclosed herein may address other matters and deficiencies in a number of technical areas, for example.

As used in the present specification and in the appended claims, the term "XR controller" refers to a component that includes a processor and a memory device. Specifically, the XR controller processes information indicative of the position of the hand and/or tool and uses the information to interact with virtual objects. The processor includes the circuitry to retrieve executable code from the memory and execute the executable code. As specific examples, the controller as described herein may include machine-readable storage medium, machine-readable storage medium and a processor, an application-specific integrated circuit (ASIC), a semiconductor-based microprocessor, and a field-programmable gate array (FPGA), and/or other hardware device.

As used in the present specification an in the appended claims, the term "memory" or "memory device" includes a non-transitory storage medium, which machine-readable storage medium may contain, or store machine-usable program code for use by or in connection with an instruction execution system, apparatus, or device. The memory may take many forms including volatile and non-volatile memory. For example, the memory may include Random-Access Memory (RAM), Read-Only Memory (ROM), optical memory disks, and magnetic disks, among others. The executable code may, when executed by the respective component, cause the component to implement the functionality described herein. The memory may include a single memory object or multiple memory objects.

Figure 4:
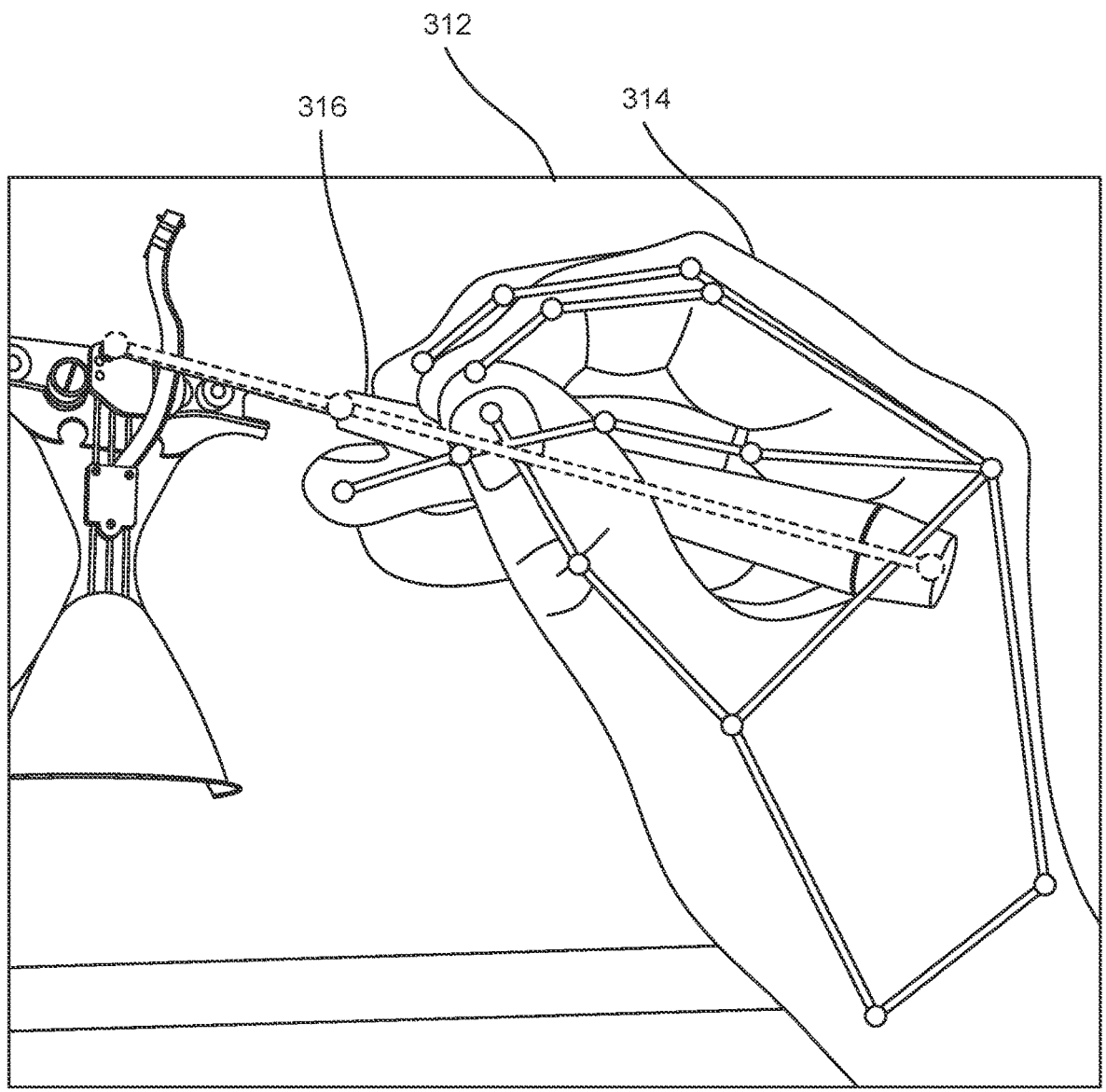

Further, as used in the present specification and in the appended claims, the term "registration feature" refers to tracking indicia that define locations on a hand and/or tool used to locate the hand and/or tool in physical space. These registration features may be locations of the hand and/or tool with a defined position and orientation in physical space. FIG. 4 depicts examples of registration features of a hand (i.e., knuckles, joints, finger tips) identified by solid circles and registration features of a tool (i.e., tool tip, tool end, and junction) identified by dashed circles. In this example, the collection of registration features defines the location of the hand and tool in physical space.

As used in the present specification and in the appended claims, the term "a number of" or similar language is meant to be understood broadly as any positive number including 1 to infinity.

Turning now to the figures, FIG. 1 is a block diagram of an extended reality (XR) system (100) for machine vision hand and tool tracking, according to an example of the principles described herein.

As described above, the term XR encompasses, VR, MR, and AR such that an XR system encompasses VR systems, MR systems, and AR systems. The content that is displayed on the XR system may be provided by the XR system itself or a host computing device such as a personal computer (PC), all-in-one device, gaming console, or the like. Accordingly, the XR system may include an input port or transceiver to receive the virtual content from a connected host computing device, which virtual content is to be displayed on the lens of the XR system. Note that while the present application relates to XR systems, the term virtual content is used to refer to the digital content in each of the VR, MR, and AR environments, as opposed to the physical work objects, that may be present in these environments.

Accordingly, to present the virtual content, the XR system (100) includes an imaging system (102) that displays the virtual objects to the user. The imaging system (102) may take a variety of forms. For example, the imaging system (102) may include a projector that projects the virtual content onto a surface such as an interior surface of an HMD or onto the transparent lens of AR glasses. In a particular example, the imaging system (102) may include a light engine and optic element which overlay virtual content over light from the physical world through a pair of glasses.

In another example, the imaging system (102) may include a light-emitting diode (LED) display on which the virtual content is displayed. While reference is made to particular imaging systems (102), the imaging system (102) may be any type of system that presents virtual content to a user, which virtual content is manipulable by the user.

The XR system (100) allows a user to interact with objects in the XR environment displayed by the imaging system (102). For example, the XR environment may include a digital drop-down menu that is projected on a transparent lens of AR glasses through which a user views a physical scene. In this example, the user may make a gesture to interact with the digital drop-down menu. For example, the user may move his/her index finger to a position that coincides with a location of the projection of the digital drop-down menu. This positioning of the index finger over the digital drop-down menu is detected and an XR controller (110) may manipulate the XR environment, for example by expanding the drop-down menu.

Accordingly, the XR system (100) includes a machine vision tracking system (104) to determine when the user's hand or tool is in the vicinity of the virtual content. That is, the machine vision tracking system (104) identifies and tracks movements of the user's hand to determine when the user's hand aligns with the virtual objects in the XR environment. Accordingly, the machine vision tracking system (104) includes a camera (106), or cameras (106), to capture images of the user's hand. A processor (108) of the machine vision tracking system (104) parses the images to identify a hand object within the image and processes the hand object such that the hand may be tracked over a sequence of images relative to the virtual objects in the XR environment.

In some examples, the machine vision tracking system (104) may include multiple cameras. With multiple camera(s) (106), the machine vision tracking system may capture stereoscopic images of the hand such that a depth of the hand may be determined. That is, multiple cameras (106) allow for a three-dimensional analysis of the hand and tool gestures.

In addition to capturing an image of the hand, the camera(s) (106) capture an image of any tool that is grasped by the user. As described above, a user may be grasping a tool such as a screwdriver, a writing implement, or an electronic probe among any variety of other tools. Similar to identifying and tracking the movement of the hand, the machine vision tracking system (104) identifies and tracks the movement of the tool.

The machine vision tracking system (104) also includes a processor (108) to analyze the image(s) and facilitate hand and tool identification and tracking. That is, the processor (108) tracks a position and orientation of the user's hand in physical space and tracks a position and orientation of the tool in physical space. Doing so facilitates the interaction of the hand and/or tool with the virtual objects in the XR environment.

The processor (108) of the machine vision tracking system (104) may identify the hand and tool in an image in a variety of ways. In an example, the machine vision tracking system (104) may be a non-machine learning system. In another example, the machine vision tracking system may be a machine learning system. In either case, the processor (108) may identify hands and tools based on object recognition operations. This could include shape recognition or other unique characteristic recognition that compares captured images to stored images or other digital data. In identifying tools, the identifying characteristics may include logos, fiducials, labels, or other identifying markers. The machine vision tracking system (104) takes the images from the camera(s) (106) as an input. The machine vision tracking system (104) outputs the pixel locations of the hand digits and tool. For a stereoscopic capture camera(s) (106), these pixel locations can be used, along with data on the physical orientation of the stereoscopic capture camera(s) (106), to determine the location of the hands and tool in 3D space (X, Y, Z, coordinate location).

In an example of a non-machine learning machine vision system, the XR system (100) may include, or reference, a database with stored images of hands and tools in various orientations with different characteristics (i.e., size, geometry, three-dimensional position). As such, the processor (108) may compare the captured images with the database of images to locate and identify the hand and tool in three-dimensional space.

In another example of a non-machine learning machine vision system, the XR system (100) may include, or reference, a database with stored images of markers, logos, fiducials, etc. that the tool has disposed on its surfaces at predetermined locations (for instance at tip and end of a tool). As such, the processor (108) may compare the captured images with the database of markers, logos, fiducials, etc. and locate and identify the markers in the image. The processor uses the location of the markers and the predetermined information of the tool and markers to determine the location of the tool in 3D space.

In an example of a machine learning machine vision system, the XR system (100) does not include a database of stored images. Rather, a machine learning system takes the images from the camera(s) (106) as an input. The machine learning XR system (100) outputs the pixel locations of the hand digits and tool using a machine vision operation. Such a machine learning machine vision tracking system (104) may implement any number of machine learning operations to achieve this task.

For example, the machine learning machine vision tracking system (104) may implement a deep neural network (DNN). A DNN includes a network of functions that map an input to an output. Each function, or neuron, has a weight for each input and an operation assigned to the input. The weight may be, for example, a value between −1 and +1. This value is multiplied with the input of the function. The function could be any continuous or non-continuous function that maps the input to an output. For example, y=x. Or y=0 for x<0 and y=x for x>=0. The neurons input the value (e.g., brightness) of a pixel in the image and output a value. After having the pixel values of the image as an input, neurons can be chained, such that the output of one neuron is the input of another. Each chain is called a layer and the DNN can contain numerous layers. Chaining thousands of neurons together creates a network of neurons. The number of neurons can be in the thousands or millions.

To train the DNN, the weights and functions of the neural network are seeded with random values. Images with identified values of the hand location and tool locations are input into the DNN. The DNN outputs 1) an estimate for the location of the hand digits and tool (based on the weights and functions of the neurons) and 2) an error between the true result. The initial error may be large as the DNN is untrained. The DNN then adjusts the weights and functions of the DNN to reduce the error (one method being back propagation) and again estimates the location of the hand digits and tool. This process is completed thousands or millions of times until the DNN is accurate at predicting the hand digit and tool locations. This type of learning may be referred to as supervised learning as the DNN is told the truth value for each input image.

One specific type of DNN that may be used is a convolutional neural network (CNN). A CNN shares many of the same characteristics of a DNN, but uses different filtering techniques that are effective and efficient for image processing applications.

To facilitate hand and tool recognition, via machine learning or otherwise, the captured images may be pre-processed. For example, each pixel in the image may be filtered to create a high-contrast version of the image where areas of high contrast are white and areas of low contrast are black. Doing so facilitates edge detection of the different objects in the image. Such image filtering may be done to highlight common shapes like fingers, fingernails, or other common features of user hands. Such image filters may also be able to detect certain tools. For examples, handheld tools may have certain geometric features such as a straight cylindrical shape. The image filter may be able to detect these features and aid the machine learning program to more accurately identify an object with such features as a tool.

Another example of image pre-processing is pooling. In an example of pooling, an image is divided into groups of pixels (e.g., 3×3 group). Within a group of pixels, the lightest pixel within the group is identified and that pixel value is assigned to a single pixel of a down-sized image. Doing so reduces the size and number of pixels in the image, and thus the number of inputs to the DNN and the overall size of the DNN.

As another example, a tool and/or hand may have an identifying marker, such as a graphic symbol placed thereon to train a machine learning system. In this example, the location of the graphic symbol, which is determined by a machine vision tracking system, may be used to establish the true positions during training of the machine learning system. This may eliminate the need for manually locating the true positions of the hand and tool for each training image.

While reference is made to particular image pre-processing operations, other pre-processing operations may be executed, including dilation, erosion, curves and level adjustment, gradient application, high pass filtering, low pass filtering, and top and bottom hat filtering, among others. Moreover, any of these pre-processing operations may be performed individually or in conjunction with other pre-processing operations, to identify a hand and tool within a captured image.

Once the training of the machine learning system is completed to a satisfactory amount, the DNN may be run on any input image and the DNN will estimate (with a high level of accuracy if the DNN was well trained) the locations of the hand digits and tool.

A machine learning machine vison tracking system (104) has increased tracking and detection capability as the machine learning machine vision tracking system (104) is not limited by the images of a database, but can be used to identify newly introduced tools that do not have a training dataset associated with the particular tool or markings on the tool (label, fiducial, etc.).

While reference is made to particular machine learning operations, the machine learning machine vision tracking system (104) may implement other machine learning operations to identify the hand and the tool.

Note that the above-described methods may be refined to identify specific tools. That is, the machine learning machine vision tracking system (104) may be trained with images of specific tools to facilitate the identification of that specific tool in a captured image. For example, if the tool is a scalpel used in a medical procedure, the processor (108) of the machine learning machine vison tracking system (104) may be trained with a dataset of images of a hand grasping a scalpel. In other examples, the machine learning system may be trained to identify any tool.

In addition to identifying the user's hand and/or tool, the machine vision tracking system (104) tracks the user's hand and/or tool as it moves in physical space. This may include analyzing a sequence of images to determine the movement of the user's hand and tool through physical space. Specifically, a machine vision tracking system (104) may employ any or all of the techniques described above (fiducial recognition, DNNs, etc.) on each image in an image sequence to determine the location of the hand and/or tool in each image. If the image sequence is captured with respect to time, for example as a live video capture, the physical movement with respect to time could thus be captured.

In an example, the machine vision tracking system (104) may employ a predictive operation to record movement of the hand and/or tool. For instance, the machine vision tracking system (104) may predict a position of the hand and/or tool based on a calculated rate of movement of the hand and/or tool. As a specific example, a hand with tool may be moving 50 pixels per second in a certain direction. Accordingly, the position of the hand and tool in the next frame, captured $\frac{1}{30}$s later, may be predicted to be 1.6 pixels (50 pixels/second*$\frac{1}{30}$ s) in this certain direction. Combining this prediction with new frame machine vision image processing may increase accuracy and speed of the machine vision system during movements.

In another example, the tracking may be based on an identifying marker that is placed on the user's hand and/or tool. That is, as described above, the user's hand and/or tool may have an identifying marker such as a graphic symbol applied to the surface. The camera (106) may capture the position of this identifying marker in each frame in a video sequence to track the movement of the user's hand and/or tool with the identifying marker disposed therein.

Note that the processor (108) may be local or remote from the camera (106). That is, in some examples the processor (108) of the machine vision tracking system (104) may be integrated on the headset of the XR system (100). In another example, the processor (108) is remote from the headset and the headset may include a wired or wireless communication device to communicate with the processor (108).

In addition to the machine vision tracking system (104), the XR system includes an XR controller (110). In general, the XR controller (110) manages the presentation of the virtual objects within the XR environment. For example, the XR controller (110) dictates the presentation characteristics of the virtual objects. Specifically, the XR controller (110) communicates with the imaging system (102) to control the presentation of the virtual objects on the lens of AR glasses.

In this example, the XR controller (110) manipulates the XR environment based on the position and orientation of the tool and the position and orientation of the hand. As described above, a user may make a hand gesture to interact with a virtual object within the XR environment. The XR controller (110) effectuates this interaction by executing the program instructions associated with the particular virtual object. For example, when the user's finger moves in a rapid downward motion in a region of physical space that corresponds to a displayed virtual button, a finger depression of a button, the XR controller (110) may 1) alter the displayed environment to reflect the depression of the button and 2) execute the function associated with the button depression.

As the present system also tracks the position and orientation of the tool, a similar rapid downward motion of the tool over the region defined by the virtual button may similarly trigger the associated function. As such, a user need not put the tool down to interact with the virtual objects, but may instead use the tool to interact with the virtual objects. Accordingly, the present XR system (100) facilitates physical handheld tool interaction with virtual objects, rather than relying entirely on hand interaction with the virtual objects.

Figure 2:
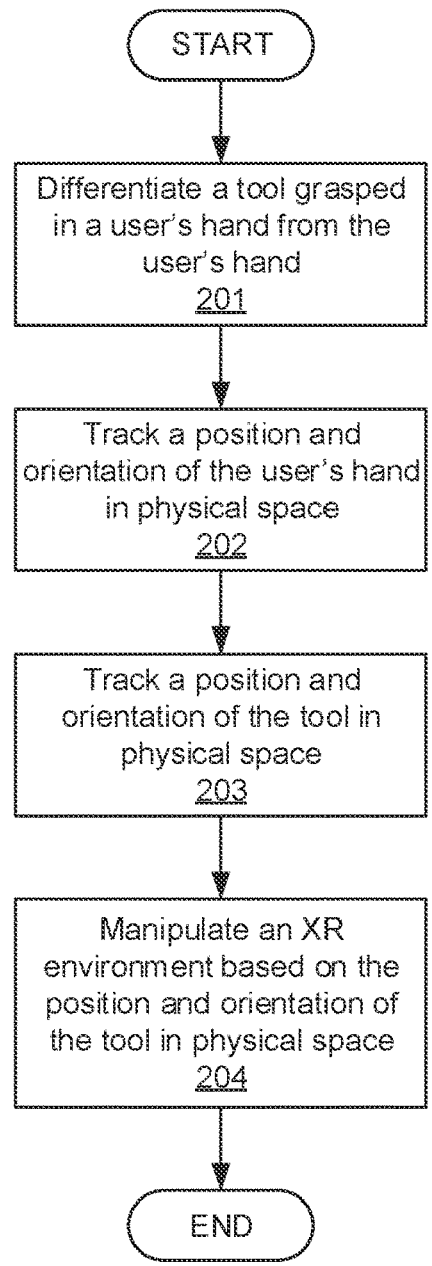
FIG. 2 is a flow chart of a method for tracking a hand and a tool with a machine vision tracking system, according to an example of the principles described herein.

FIG. 2 is a flow chart of a method (200) for tracking a hand and a tool implementing a machine vision tracking system (104), according to an example of the principles described herein. According to the method (200), a machine vision tracking system (104) differentiates (block 201) a tool grasped in the user's hand from the user's hand. As described above, a tool in a user's hand may negatively impact the user's ability to interact with virtual objects and may interrupt the machine vision tracking system (104) tracking of the user's hand movement. The present method (200) addresses these issues by not only tracking the movement of the user's hand, but also tracking the movement of the tool itself, thus rendering the tool as a physical object that may be recognized, tracked, and used to interact with the XR environment.

As such, the present method (200) identifies, within a stream of captured images, a user's hand and differentiates a tool that is in the user's hand from the user's hand. This may be done in any number of ways. Hands and tools have different physical and geometric features. For example, the texture, color, shape, contours, etc. of hands differ from those of tools. Accordingly, the processor (108) of the machine vision tracking system (104) may differentiate a user's hand from a tool based on the physical characteristics and geometry of the tool and how these physical characteristics of the tool are different from those of a hand. This may include object recognition.

Specifically, the processor (108) may identify edges of different objects and determine geometries of the different objects. Identified geometries are indicative of a particular object. For example, an object that is long and thin with straight edges may be identified as a tool as human fingers are wider than tools and have edges that are not as straight as the edges of tools. While reference is made to object geometry as a distinguishing feature between a tool and a user's hand, other characteristics may similarly be relied on to differentiate the tool from the hand. Examples of other characteristics that may be used to differentiate a tool from the hand include surface finish, color, shape, size, complexity, texture, light reflectance, and surface roughness, among others.

As described above, characteristic identification and differentiation (block 201) based thereon may use machine learning. Implementation of machine learning enables increased flexibility as the machine learning machine vision tracking system (104) may learn to identify newly introduced tools under a variety of circumstances whereas a hard-coded non-machine learning system 1) has a database of images to compare against the captured images and 2) may not be able to identify newly introduced tools for which there are not yet any database of images.

The processor (108) may extract registration features from captured images. Registration features identify the location of elements of a hand that are common across all hands and indicative of user's hand and registration features identify the location of elements of a tool that are common across tools and indicative of the tool. For example, registration features of a hand may include joints, knuckles, and tips of fingers. By comparison, registration features of a tool may include the ends or angles of the tool.

The machine vision tracking system (104) tracks (block 202) a position and orientation of the user's hand as it moves through physical space and tracks (203) a position and orientation of the tool as it moves through physical space. In some examples, this may include analyzing frames of video streams to detect the position and orientation of registration features of the hand and/or tool and tracking the different position and orientation of those registration features through the frames.

Tracking the position and orientation of the user's hand in physical space may include 1) tracking the position and orientation of registration features (i.e., tips, knuckles, joints), of the user's hand in the image as well as a relative position between the position and orientation of the registration features of the user's hand relative to other registration points of the user's hand. Based on this information, the processor (108) may determine the position and orientation (i.e., the pose) of the hand.

In another example, hand tracking may be done via an electronic glove worn on the hand. For example, an electronic glove may include tracking markers that are electronically or optically tracked by the tracking system. These markers may be tracked through the sequence of frames to identify the movement of the hand in physical space. In these cases, tracking the tool may still be based on machine vision image processing as described in the previous paragraphs. While reference is made to particular tracking gloves, other types of glove-tracking systems may be implemented in accordance with the principles described herein.

Similarly, tracking the position and orientation of the tool in physical space may include 1) tracking the position and orientation of registration features (e.g., ends), of the tool in the image as well as a relative position between the position and orientation of the registration features of the tool relative to other registration features of the tool.

In an example, tool detection may be based on the pose of the hand. For example, the pose of a hand may be estimated based on the position of the palm and fingers, and the position of the palm and the fingers relative to one another. If the determined pose of the hand is indicative of a user holding a tool, the machine vision tracking system (100) may have additional information that is indicative of the type of tool and movement of the tool. For instance, if the pose of the hand indicates a user is holding a long, thin, and straight object, the machine vision tracking system (104) may identify the particular object as potentially a pen or a pencil.

In some examples a portion of the hand and/or tool may be visually occluded by other objects within the frame. In this example, the method (200) may include estimating a position of an occluded portion of the hand and/or tool. For instance, if the tip of the tool is tracked and occluded by a hand of the user, the machine vision tracking system (104) may calculate/estimate the tip position based on other registration features of the tool and/or hand. Based on this information, the processor (108) may be able to determine the position and orientation (i.e., the pose) of the tool through a sequence of frames even as the orientation, position, and even visibility of the tool in the image change in time.

Based on the position and orientation of the user's hand and/or the tool, the XR system (100) manipulates (block 204) the XR environment. Specifically, the XR environment is made up of virtual and/or real-world physical objects. The user hand and/or tool allows the user to interact with the virtual objects as described above. This may include grabbing, moving, or otherwise changing the relative position and orientation of the virtual object within the XR environment. The interaction may include interacting with user interface objects such as buttons, sliders, drop-down menus, etc.

As another example, manipulation (block 204) of the XR environment may include creating a virtual representation within the XR environment. For example, with the tool and/or the hand, the user could draw a line or sequence of lines to draw a picture, text, or other image. In yet another example, the user, via the tool or a finger, may move a cursor within the XR environment.

As yet another example, manipulation (block 204) of the XR environment may including altering a program based on the tool being held. For instance, responsive to the machine vision tracking system (104) recognizing the user holding a pencil, an XR drawing tool may draw a thin line. By comparison, responsive to the machine vision tracking system (104) recognizing the user holding an eraser, an XR drawing tool may erase a line. As yet another example, responsive to the machine vision tracking system (104) detecting the user holding a marker, the XR drawing tool may draw a thick line. As another example, the XR controller (114) may open a first application responsive to detecting a user holding a screwdriver and may open a second application responsive to detecting the user is holding a pen.

While reference is made to particular manipulations of the virtual objects within the XR environment, other manipulations of the XR environment may be implemented based on the position of the tool and user's hand. Accordingly, the present method (200) depicts a system that not only tracks hand movement to facilitate XR environment manipulation, but differentiates a tool held by the user from the hand of the user, and tracks the movement of the tool to facilitate XR environment manipulation. In other words, the XR controller (110) manipulates the XR environment based on the position and orientation of the user's hand and the position and orientation of the tool.

Figure 3:
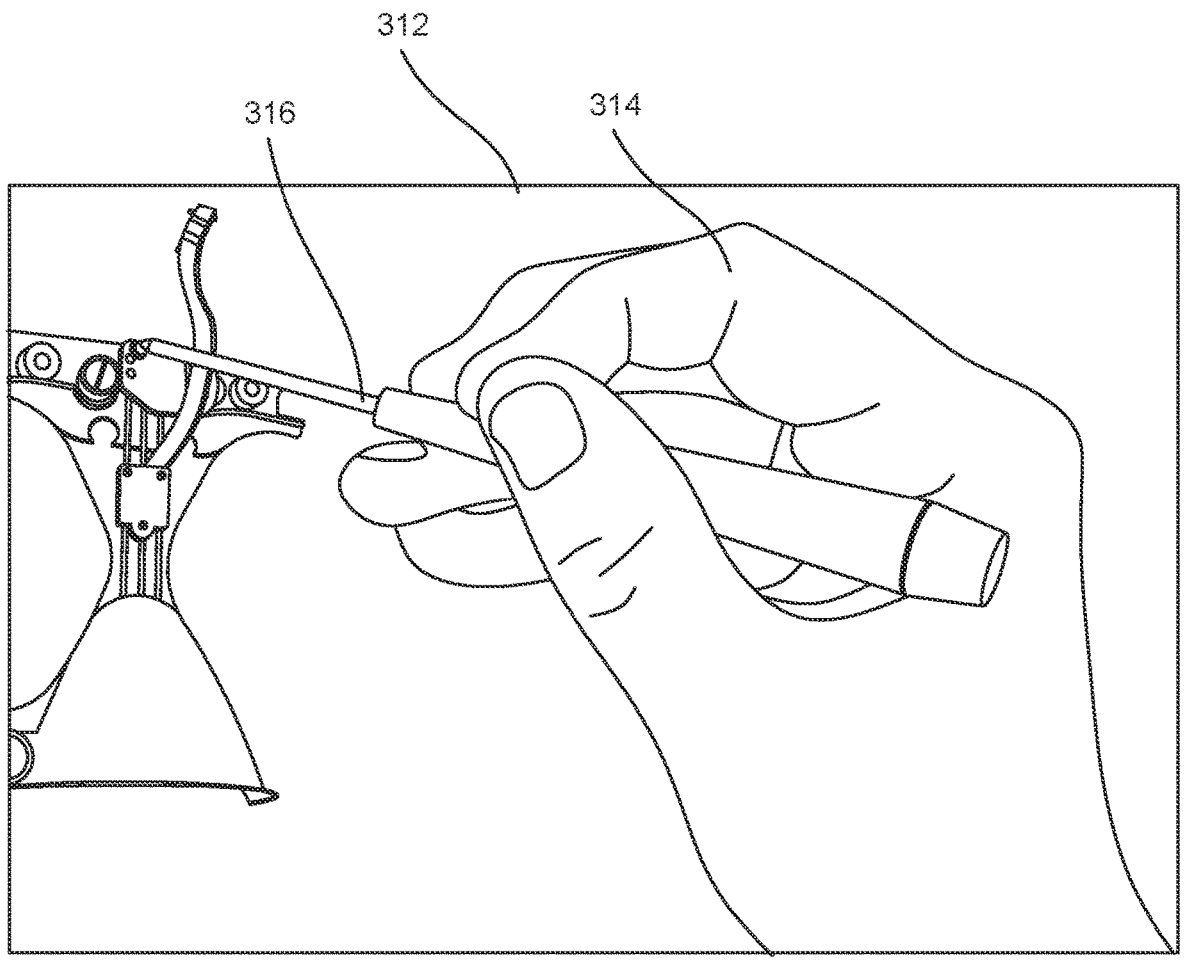
FIGS. 3 and 4 depict a machine vision-tracked hand and tool, according to an example of the principles described herein.

FIGS. 3 and 4 depict a machine vision-tracked hand (314) and tool (316), according to an example of the principles described herein. Specifically, FIG. 3 depicts an image (312) of a hand (314) that is grasping a tool (316), which in the example depicted in FIG. 3 is a screwdriver. FIG. 4 depicts the same image (312) with tracking indicia overlaid on top of the hand (314) and the tool (316). That is, FIG. 4 identifies the registration features of the hand (knuckles, tips, and joints) with solid circles. These registration features are shown connected to one another via solid lines. Accordingly, based on the position of these registration features and the position of the registration features relative to one another, the pose of the hand (314) is determined by a machine vision tracking system (104). Similarly, FIG. 4 depicts the registration features of the tool (i.e., ends, junctions) with dashed circles. These registration features are shown connected to one another via dashed lines. Based on the position of these registration features and the position of the registration features relative to one another, the pose of the tool (316) is determined by a machine vision tracking system (104).

As described above, tools (316) and hands (314) have different dimensions and geometries and the machine vision tracking system (104) may identify these differences to differentiate the tool (316) from the hand (314). That is, the machine vision tracking system (104), may identify the tool (316) based on physical dimensions and geometry of the tool (316) and more specifically by comparing the physical characteristics of the tool (316) to the physical characteristics of the user's hand (314).

In the example depicted in FIGS. 3 and 4, the registration features of the tool (316) indicate that the tool (316) is long, straight, and thin. By comparison, the registration features of the hand (314) indicate a more complex, contoured surface. Accordingly, the machine vision tracking system (104) differentiates the tool (316) from the hand (314). While reference is made to object differentiation based on one characteristic, i.e., straight and thin, differentiation may be made on other characteristics identified by the machine vision tracking system (104) including, but not limited to, light reflectance, surface features, color, geometry, and surface finish, among others. As described above, these differentiating characteristics are those learned during training of a machine learning machine vision system. By comparison, in a non-machine learning machine vision system, these differentiating characteristics may be presented in a database of images against which captured images of a user's hand are compared.

In an example, the identification and tracking of the position and orientation of the tool (316) may be based on a fiducial marker disposed on the tool. For example, the tool (316) may include a visual or electronic marker that may be tracked by the processor (108). As a particular example, the tool (316) may include a graphic symbol which is printed on or adhered to the tool (316). Based on this graphic symbol, the processor (108) may track the movement of the tool (316) based on identifying the position and location of the graphic symbol across frames of a video stream. In another example, the tool (316) may include an electronic tracker that is sensed and recorded by the machine vision tracking system (104) to identify the position and location of the tool (316) across frames of a video stream.

In an example, the tool (316) identity may be inferred based on a pose of the user's hand (314) while gripping the tool (316). For example, a user grasps a hammer differently than he/she grasps a pencil or electronic probe. Accordingly, when registration features of the finger tips are close to a single point as depicted in FIG. 4, it may indicate that the tool (316) is a narrow tool, such as the screwdriver depicted.

As such, the present XR system (100) and method (200) may be used to differentiate a tool (316) from the hand (314) that holds the tool (316). By so doing, the XR system (100) allows a tool (316) in the hand (314) to be an input object to the XR environment, rather than requiring a user to put the tool (316) down before interacting with virtual objects in the XR environment.

Figure 5:
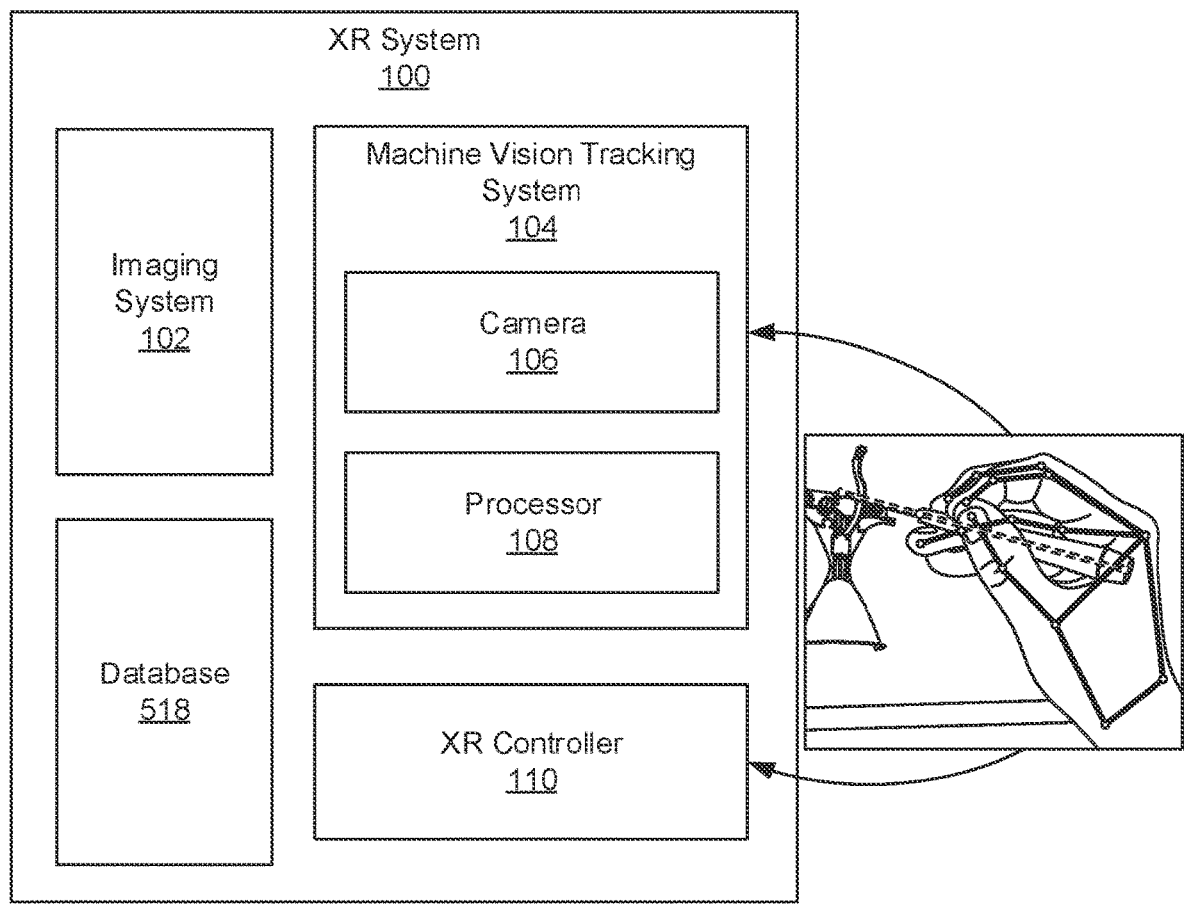
FIG. 5 is a block diagram of an extended reality (XR) system for machine vision hand and tool tracking, according to an example of the principles described herein.

FIG. 5 is a block diagram of an extended reality (XR) system (100) for machine vision hand and tool tracking, according to an example of the principles described herein. Specifically, FIG. 5 depicts a machine-vision tracking system (100) that is a non-machine learning system. Specifically, in the example depicted in FIG. 5, the machine-vision tracking system (104) identifies the hand and tool based on a direct comparison to stored images of hands and tools.

In the example depicted in FIG. 5, the XR system (100) includes an additional component to detect the tool (316) in the image (312) and to differentiate one tool from another tool. Specifically, the XR system (100) includes, or remotely accesses, a database (518) of images of markers (e.g., labels, fiducials, etc.) attached at specific locations on tools. In this example, the processor (108) may identify the tool (316) grasped in the user's hand (314) by searching for markers from the database (518) in the captured images. That is, the database (518) may include any number of makers associated with any number of tools. This process may be completed for each sequential frame of the video stream to identify the position and orientation of the tool (316) over time.

Figure 6:
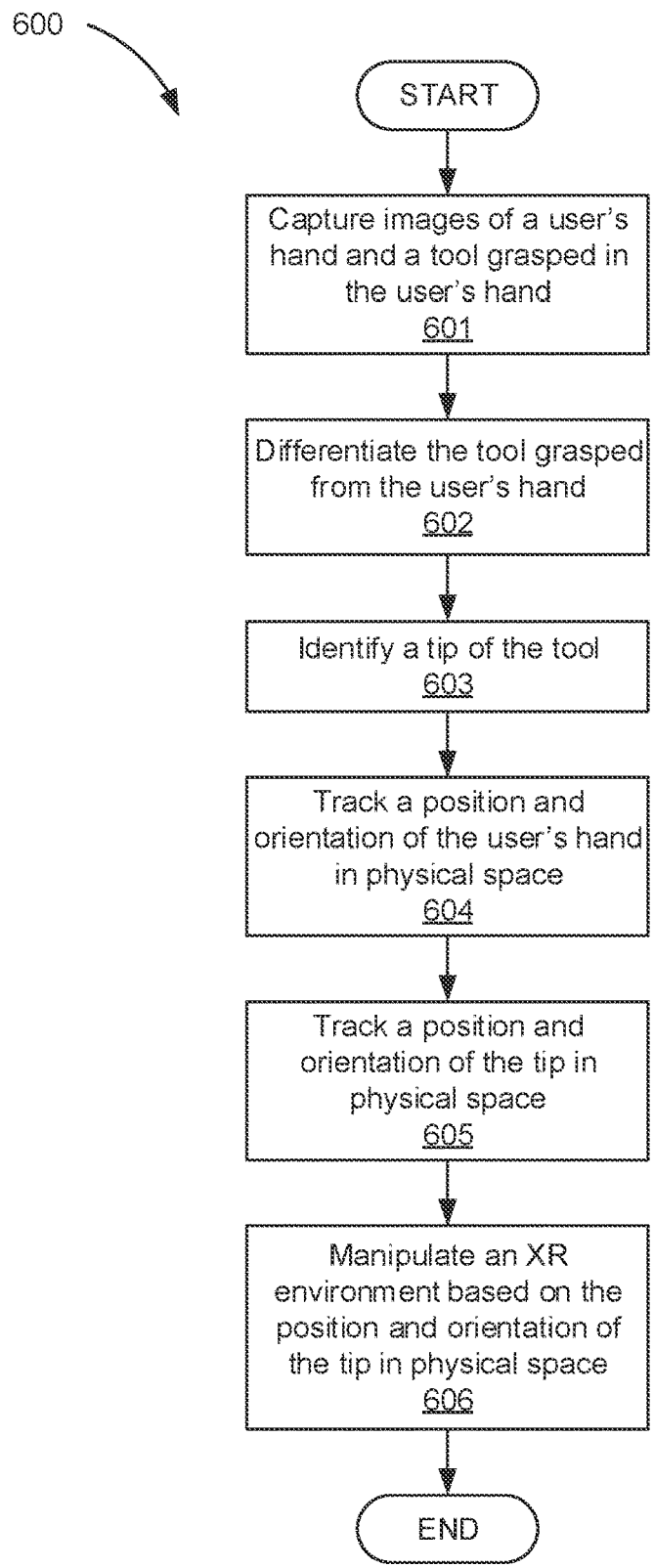
FIG. 6 is a flow chart of a method for tracking a hand and a tool with a machine vision tracking system, according to an example of the principles described herein.

FIG. 6 is a flow chart of a method (600) for tracking a user's hand (314) and a tool (316) implementing a machine vision tracking system (104), according to an example of the principles described herein. The method (600) includes capturing (block 601) images of the user's hand (314) and the tool (316) grasped in the user's hand (314). This may be performed by the camera (106) of the machine vision tracking system (104). In an example, this may be performed by multiple cameras (106) such that stereoscopic images may be captured. From such stereoscopic images, a depth of the hand (314) and tool (316) may be inferred. That is, the three-dimensional coordinates for the registration features of the hand (314) and tool (316) may be determined from the stereoscopic images. While reference is made to using multiple cameras (106) to determine image depth, other operations may be implemented in accordance with the principles described herein. Examples include a time-of-flight camera, patterned light transition and detection, and acoustic transmission and detection.

The tool (316) grasped in the user's hand (314) may then be differentiated from the user's hand (314). This may include extracting, from the images, registration features of the user's hand (314) and extracting from the image, registration features of the tool (316). The registration features of the hand (314), i.e., locations of the finger tips, knuckle, joints, may be identified and associated with a "hand" object while the registration features indicative of the tool (316), i.e., locations of tool tips, bends, etc. may be grouped as a "tool" object. As such, the present method (600) differentiates the tool (316) from the user's hand (314) such that either may be used to manipulate the virtual objects within the XR environment.

In an example, the method (600) includes identifying (block 603) a tip of the tool (316). That is, it may be anticipated that the tip of the tool (316) is to be used to interact with the virtual objects. Accordingly, by identifying the tip of the tool (316), the processor (108) may more accurately and precisely facilitate user interaction with the virtual objects of the XR environment. That is manipulation of the XR environment may be based on the position and orientation of the tip of the tool (316). For example, when the tip of the tool (316) coincides with a region defined by a virtual button, the processor (108) executes a function associated with the virtual button.

In this example, the processor (108) may track (block 604) the position and orientation of the user's hand (314) and track (block 605) the position of the tip of the tool (316). These operations may be performed as described above in connection with FIG. 2.

As such, the XR controller (110) manipulates (block 606) the XR environment based on the position and orientation of the tip of the tool (316). This operation may be performed as described above in connection with FIG. 2.

Figure 7:
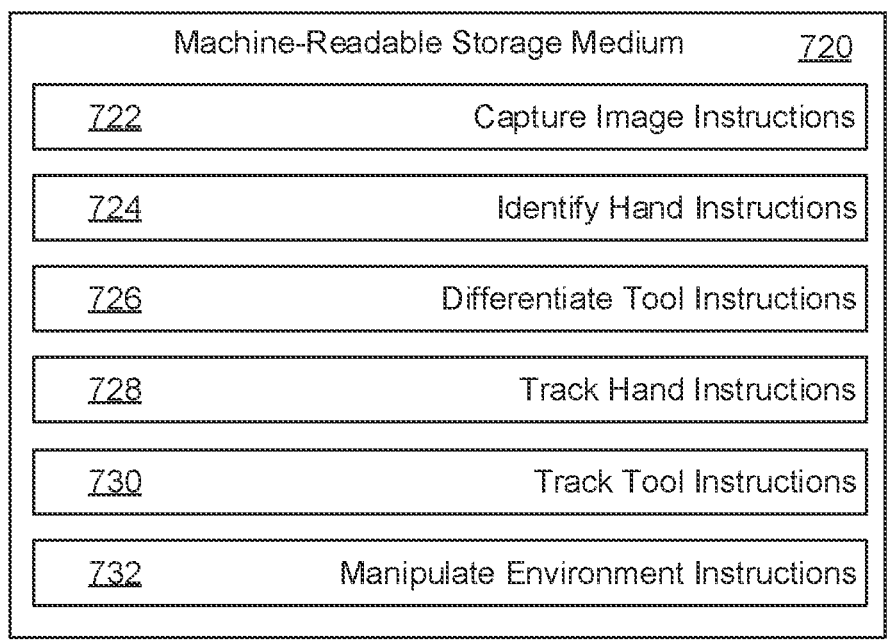
FIG. 7 depicts a non-transitory machine-readable storage medium for tracking a hand and tool with a machine vision tracking system, according to an example of the principles described herein.

FIG. 7 depicts a non-transitory machine-readable storage medium (720) for tracking a hand (316) and tool (316) with a machine vision tracking system (104), according to an example of the principles described herein. To achieve its desired functionality, the XR system (100) includes various hardware components. Specifically, the XR system (100) includes a processor (108) and a machine-readable storage medium (720). The machine-readable storage medium (720) is communicatively coupled to the processor (108). The machine-readable storage medium (720) includes several instructions (722, 724, 726, 728, 730, 732) for performing a designated function. In some examples, the instructions may be machine code and/or script code.

The machine-readable storage medium (720) causes the processor (108) to execute the designated function of the instructions (722, 724, 726, 728, 730, 732). The machine-readable storage medium (720) can store data, programs, instructions, or any other machine-readable data that can be utilized to operate the XR system (100). Machine-readable storage medium (720) can store machine-readable instructions that the processor (108) of the XR system (100) can process, or execute. The machine-readable storage medium (720) can be an electronic, magnetic, optical, or other physical storage device that contains or stores executable instructions. Machine-readable storage medium (720) may be, for example, Random-Access Memory (RAM), an Electrically Erasable Programmable Read-Only Memory (EEPROM), a storage device, an optical disc, etc. The machine-readable storage medium (720) may be a non-transitory machine-readable storage medium (720).

Referring to FIG. 7, capture image instructions (722), when executed by the processor (108), cause the processor (108) to capture images (312) of the user's hand (314) and the tool (316) grasped in the user's hand (314). Identify hand instructions (724), when executed by the processor (108), cause the processor (108) to, identify, with a machine vision tracking system (104), the user's hand (314) in the images (312). Differentiate tool instructions (726), when executed by the processor (108), cause the processor (108) to, with the machine vision tracking system (104), differentiate the tool (316) grasped in the user's hand (314) from the user's hand (314). Track hand instructions (728), when executed by the processor (108), cause the processor (108) to, with the machine vision tracking system (104), track a position and orientation of the user's hand (314). Track tool instructions (730), when executed by the processor (108), cause the processor (108) to, with the machine vision tracking system (104), track a position and orientation of the tool (316). Manipulate environment instructions (732), when executed by the processor (108), cause the processor (108) to, manipulate the XR environment based on the position and orientation of the tool (316) and the position and orientation of the user's hand (314).

In summary, such a system, method, and machine-readable storage medium may, for example, 1) allow for virtual object interaction even when grasping a physical tool; 2) differentiate between the hand and the tool such that the machine vision tracking system accurately tracks each element; and 3) implement machine learning such that tool identification need not be hard-coded into the XR system. However, it is contemplated that the devices disclosed herein may address other matters and deficiencies in a number of technical areas, for example.

What is claimed is:
1. An extended reality (XR) system, comprising:
an imaging system to present virtual objects to a user;
a machine vision tracking system comprising:
a camera to capture images of the user's hand and a tool grasped in the user's hand; and
a processor to:
identify the tool grasped in the user's hand;
differentiate the tool grasped in the user's hand from the user's hand by:
extracting, from the images, a set of registration features of the user's hand that define a position and orientation of the user's hand; and extracting, from the images, a set of registration features of the tool that define a position and orientation of the tool;
track the position and orientation of the user's hand in physical space; and
track the position and orientation of the tool in physical space; and
an XR controller to manipulate an XR environment based on:
the position and orientation of the tool; and
the position and orientation of the user's hand.

2. The XR system of claim 1, wherein the machine vision tracking system comprises a machine learning system to identify the tool grasped in the user's hand.

3. The XR system of claim 2, wherein the machine learning system is trained to identify the tool based on physical characteristics of the tool.

4. The XR system of claim 1, wherein the processor is to identify the tool and track the position and orientation of the tool in physical space based on an identifying marker disposed on the tool.

5. The XR system of claim 1, wherein the processor is to estimate a location of an occluded portion of the tool.

6. The XR system of claim 1, wherein the processor is to identify the tool based on a pose of the user's hand while grasping the tool.

7. The XR system of claim 1, wherein the processor is to identify the tool by comparing physical characteristics of the tool to physical characteristics of the user's hand.

8. The XR system of claim 1, wherein the XR controller is to manipulate the XR environment based on the position and orientation of the tool by:
interacting with a virtual object;
creating a visual representation within the XR environment;
moving a cursor in the XR environment; or
a combination thereof.

9. The XR system of claim 1, wherein the processor is to differentiate the tool grasped in the user's hand from the user's hand by grouping the set of registration features of the user's hand and the set of registration features of the tool, wherein the set of registration features of the user's hand are distinct from the set of registration features of the tool.

10. A method, comprising:
capturing images of a user's hand and a tool grasped in the user's hand;
differentiating, with a machine vision tracking system, the tool grasped in the user's hand from the user's hand by:
extracting, from the images, a set of registration features of the user's hand that define a position and orientation of the user's hand; and
extracting, from the images, a set of registration features of the tool that define a position and orientation of the tool;
tracking, with the machine vision tracking system, the position and orientation of the user's hand in physical space;
tracking, with the machine vision tracking system, the position and orientation of the tool in physical space; and
manipulating an extended reality (XR) environment based on:
the position and orientation of the user's hand; and
the position and orientation of the tool.

11. The method of claim 10, wherein the machine vision tracking system comprises a neural network trained to identify the tool grasped in the user's hand.

12. The method of claim 10, further comprising differentiating the tool grasped in the user's hand from the user's hand by grouping the set of registration features of the user's hand and the set of registration features of the tool, wherein the set of registration features of the user's hand are distinct from the set of registration features of the tool.

13. The method of claim 10, wherein differentiating the tool grasped in the user's hand from the user's hand is based on machine learning that identifies the tool based on physical characteristics of the tool.

14. The method of claim 10, wherein:
tracking the position and orientation of the user's hand in physical space comprises tracking:
the position and orientation of the set of registration features of the user's hand; and
a relative position and orientation of the set of registration features of the user's hand relative to other registration features of the user's hand; and
tracking the position and orientation of the tool in physical space comprises tracking:
the position and orientation of the set of registration features of the tool; and
a relative position and orientation of the set of registration features of the tool relative to other registration features of the tool.

15. The method of claim 10, wherein manipulating the XR environment based on the position and orientation of the tool in physical space comprises:
interacting with a virtual object;
creating a visual representation within the XR environment;
moving a cursor in the XR environment; or
a combination thereof.

16. A non-transitory machine-readable storage medium encoded with instructions executable by a processor to:
capture images of a user's hand and a tool grasped in the user's hand;
identify, with a machine vision tracking system, the user's hand in the images;
differentiating, with the machine vision tracking system, the tool grasped in the user's hand from the user's hand;
track, with the machine vision tracking system, a position and orientation of the user's hand in physical space;
track, with the machine vision tracking system, a position and orientation of the tool in physical space; and
manipulate an extended reality (XR) environment based on:
the position and orientation of the tool in physical space; and
the position and orientation of the user's hand in physical space;
wherein manipulating the XR environment based on the position and orientation of the tool in physical space comprises:
interacting with a virtual object;
creating a visual representation within the XR environment;
moving a cursor in the XR environment; or
a combination thereof.

17. The non-transitory machine-readable storage medium of claim 16, further comprising instructions executable by the processor to identify a tip of the tool, wherein manipulating the XR environment is based on the position and orientation of the tip of the tool in physical space.

18. The non-transitory machine-readable storage medium of claim 16, wherein differentiating the tool grasped in the user's hand from the user's hand comprises:

extracting, from the images, a set of registration features of the user's hand that define the position and orientation of the user's hand; and extracting, from the images, a set of registration features of the tool that define the position and orientation of the tool.

19. The non-transitory machine-readable storage medium of claim 18, wherein:

differentiating the tool grasped in the user's hand from the user's hand comprises grouping the set of registration features of the user's hand and the set of registration features of the tool; and the set of registration features of the user's hand are distinct from the set of registration features of the tool.

20. The non-transitory machine-readable storage medium of claim 16, wherein the machine vision tracking system comprises a neural network trained to identify the tool grasped in the user's hand.

* * * * *